United States Patent
Maj et al.

(10) Patent No.: US 8,601,264 B2
(45) Date of Patent: Dec. 3, 2013

(54) SYSTEMS AND METHODS OF USER AUTHENTICATION

(75) Inventors: Artur Maj, Skarzysko Kamienna (PL); Maciej Sztenke, Warsaw (PL)

(73) Assignee: Oracle International Corporation, Redwood Shores, CA (US)

( * ) Notice: Subject to any disclaimer, the term of this patent is extended or adjusted under 35 U.S.C. 154(b) by 1294 days.

(21) Appl. No.: 11/718,494

(22) PCT Filed: Nov. 2, 2004

(86) PCT No.: PCT/PL2004/000090
§ 371 (c)(1),
(2), (4) Date: May 8, 2007

(87) PCT Pub. No.: WO2006/049520
PCT Pub. Date: May 11, 2006

(65) Prior Publication Data
US 2008/0016347 A1    Jan. 17, 2008

(51) Int. Cl.
*H04L 29/00*    (2006.01)
(52) U.S. Cl.
USPC .......................... 713/168; 713/171; 713/183
(58) Field of Classification Search
USPC .............................................. 713/168; 726/5
See application file for complete search history.

(56) References Cited

U.S. PATENT DOCUMENTS

| | | | |
|---|---|---|---|
| 4,599,489 A | 7/1986 | Cargile | |
| 4,856,062 A | 8/1989 | Weiss | |
| 5,060,263 A | 10/1991 | Bosen et al. | |
| 5,367,572 A | 11/1994 | Weiss | |
| 5,432,851 A | 7/1995 | Scheidt et al. | |
| 5,892,902 A * | 4/1999 | Clark | 726/5 |
| 6,108,785 A | 8/2000 | Poisner | |
| 6,173,400 B1 * | 1/2001 | Perlman et al. | 713/172 |
| 7,519,986 B2 * | 4/2009 | Singhal | 726/2 |
| 8,127,142 B2 * | 2/2012 | Cuppett | 713/186 |
| 2002/0034301 A1 | 3/2002 | Andersson | |
| 2003/0204726 A1 * | 10/2003 | Kefford et al. | 713/171 |
| 2004/0181674 A1 | 9/2004 | Theimer | |

FOREIGN PATENT DOCUMENTS

| | | |
|---|---|---|
| EP | 1016947 A | 7/2000 |
| EP | 1139200 A | 10/2001 |

* cited by examiner

*Primary Examiner* — Jeffrey Pwu
*Assistant Examiner* — Helai Salehi
(74) *Attorney, Agent, or Firm* — Kilpatrick Townsend & Stockton LLP

(57) ABSTRACT

Various embodiments of the invention provide enhanced authentication solutions, including without limitation methods, systems and software programs for authenticating an entity and/or for facilitating such authentication. In accordance with certain embodiments, an entity (such as a user, a computer, etc.) attempts to authenticate in order to use a resource (such as a server, an application, etc.). Merely by way of example, the entity may provide a username or some other identifier to a computer responsible for authenticating the entity. In response, the authenticating computer may transmit a challenge, such as an authentication code. In particular embodiments, the challenge may be used to derive an authentication reply, which in turn may be used to derive and/or create a password (in one set of embodiments, the authentication reply itself may be the password). The derivation of the authentication reply may also require the user to provide some sort of identification, such as a personal information code ("PIC"), biometric verification, etc. The password then may be supplied to the authenticating computer, which can, in some cases, use the username and the password to authenticate the entity.

49 Claims, 5 Drawing Sheets

SYSTEMS AND METHODS OF USER AUTHENTICATION

BACKGROUND OF THE INVENTION

The present invention relates generally to computer security and, more specifically, to the authentication of users and other entities on a computer system.

Those skilled in the art understand that authentication is a very important part of computer security, and that authentication may be implemented on several levels. Merely by way of example, a computer's operating system may require user authentication before allowing access to the computer itself, and/or various applications (including without limitation relational database management systems ("RDBMS"), such as Oracle Corp.'s Oracle 10 g™ RDBMS) can require authentication before allowing access to the application (and/or any databases, files, etc. used by the application). Some operating systems and/or applications offer a "single login," whereby a user can authenticate once (e.g., at the operating system level), and the software thereafter will perform additional authentication (as necessary) on behalf of the user (e.g., by storing additional usernames/passwords, by providing other verification of the user's identity, etc.). There are many other forms of authentication well known in the art.

One common way to authenticate an entity (such as a user) is by requiring the entity to provide a username and a password. This is particularly common in situations in which a user operating a client computer desires access to a resource (operating system, application, etc.) on a server computer, although password authentication is not uncommon on a single-computer system (such as a user's home PC) as well. In such situations, the operating system, application, etc. (which may be on the server) generally will store the user's username and password (often in an encrypted file, as a hash table, etc. for security), and will compare the provided username and password with the stored information. If the provided username and password match the stored information, the user is considered authentic and is thereafter allowed to access whatever resources were protected by the authentication.

Although common, the username/password scheme suffers from a variety of security vulnerabilities. Merely by way of example, if the stored usernames and passwords are insufficiently protected (by encryption, hashing, etc.), they may be retrieved and thereafter used by illegitimate users seeking access to the system, application, etc. Moreover, if a user is careless with his/her username and/or password (e.g., by writing the username and/or password in an accessible location, giving this information to an untrustworthy person, choosing an easily-identifiable password, etc.), that carelessness may result in a third party gaining unauthorized access to a system. Further, in recent times, password security has become subject to a variety of technological attacks, such as packet-sniffing (i.e., eavesdropping on the communications between a user's computer and a server) and key logging (i.e., installing a software and/or hardware component on the user's computer to intercept and log the user's keystrokes) to identify a username and/or password "in transit" to the authenticating entity (e.g., a server, operating system, application, etc.).

Some of these vulnerabilities can be mitigated by taking proper precautions, but those skilled in the art will appreciate that it is virtually impossible to assure perfect security of password information. For this reason, many authentication schemes require users to change passwords regularly, under the rationale that, even if a password is compromised, the compromise will be remedied when the password is changed. Nonetheless, even this solution leaves open a window of time during which an unauthorized person might gain access to a resource before the user (who likely is unaware of the compromise) is required to change his/her password.

Another possible solution is the use of "one time" passwords schemes, which generally provide passwords that are available only for a single use, after which they expire, with a new password being used for each authentication. Such schemes have proven relatively difficult to implement in a usable manner for computer authentication, however, since they often require the exchange of sequential lists of passwords between the server and client, producing additional security vulnerabilities. An alternative is an algorithm-based password system, wherein an authenticating server is configured to calculate a password at the time of authentication, usually based upon a time-dependent algorithm. In order to authenticate, the user generally carries a hardware token (such as a key fob or some other device) that likewise calculates an identical password using a corresponding algorithm. By consulting the hardware token, the user will ascertain the proper password for that time, and by providing that password, the user can authenticate. This model, while generally more secure than those discussed above, can present logistical (and other) problems. Merely by way of example, if the hardware token and the server become out of synchronization, the respective passwords generated by the hardware token and the server likely will not match until the devices have been re-synchronized. Moreover, if the user does not have the hardware token when attempting to authenticate, the user will be unable to authenticate. Similarly, an unauthorized person may use an illegitimately-acquired token to masquerade as the authorized user to whom the token was issued, since the tokens themselves often are left unsecured by passwords, etc. That is, mere possession of the hardware token is assumed to assure the authenticity of the user, creating additional security vulnerabilities.

Hence, those skilled in the art will appreciate the need for more flexible and secure authentication models.

BRIEF SUMMARY OF THE INVENTION

Various embodiments of the invention, therefore, provide enhanced authentication solutions, including without limitation methods, devices, systems and software programs for authenticating an entity and/or for facilitating such authentication. In accordance with certain embodiments, an entity (such as a user, a computer, etc.) may attempt to authenticate in order to use a resource (such as a server, an application, etc.). Merely by way of example, the entity may provide a username or some other identifier to a computer responsible for authenticating the entity. In response, the authenticating computer may transmit a challenge, such as an authentication code. In particular embodiments, the challenge may be used to derive an authentication reply, which in turn may be used to derive and/or create a password (in one set of embodiments, the authentication reply itself may be the password). The derivation of the authentication reply may also require the user to provide some sort of identification, such as a personal information code ("PIC"), biometric verification, etc. The password then may be supplied to the authenticating computer, which can, in some cases, use the username and the password to authenticate the entity.

One set of embodiments provides methods of authentication. An exemplary method can include receiving a request for authentication (perhaps at a computer). In some cases, the request for authentication may be received from a second computer. The method may further comprise transmitting an authentication code, perhaps for reception by a stand-alone device. (In particular embodiments, the method may further comprise generating the authentication code, perhaps based on the request for authentication.) Transmitting an authentication code for reception by a stand alone device can comprise transmitting the authentication code directly to the stand alone device. In other embodiments, however, the authorization code may be transmitted to a second computer, where it may be provided to the user, e.g., by displaying the authorization code on a display. Hence, the authentication code may be received directly from the computer, from a user, etc.

Some methods may include receiving at the computer a password derived from the authentication code. Merely by way of example, the authentication code may be received (e.g., at the stand alone device), and/or an authentication reply may be derived from the authentication code. The password, then, may be derived from the authentication reply. For instance, the password may itself be the authentication reply, may comprise the authentication reply, etc. An entity (such as a user, a computer, a software application, etc.) thus may be authenticated, based on the password. In particular embodiments, the method can comprise generating at the computer a model password, perhaps based on the authentication code, and/or authenticating the entity may comprise comparing the received password with the model password.

A wide variety of stand-alone devices may be used, in accordance with various embodiments of the invention. Merely by way of example, the stand-alone device may be a telephone (including without limitation a wireless telephone), a personal digital assistant, a personal computer, etc. In some cases, the stand-alone device may be Java-enabled.

Another exemplary method of authenticating a user can comprise receiving at a first computer a request for authentication from a second computer, and/or, based on the received request for authentication, transmitting an authentication code for reception by a stand-alone device. The exemplary method can further include receiving from the second computer a password derived from the authentication code and/or authenticating an entity based on the password.

Other embodiments of the invention provide methods for facilitating the authentication of an entity. One such method can comprise receiving an authentication code at a stand-alone device. The authentication code may be based on a request for authentication, and/or an authentication reply may be derived from the authentication code. Deriving an authentication reply can comprise, inter alia, receiving a personal information code from the entity, decrypting a user token, receiving an authentication code, and/or deriving the authentication reply with the user token. Deriving the authentication reply with the user token can comprise combining in some fashion the user token and the authentication code and/or creating a hash value from the combined user token and authentication code. In particular embodiments, deriving the authentication reply with the user token can further comprise deriving a mask from the user token and/or applying the mask to the hash value to create a masked hash value.

The authentication reply may be provided to an entity (including without limitation those entities described above), and/or the authentication reply may be used to derive a password for authenticating the entity on a computer system. In particular embodiments, providing the authentication reply to an entity may comprise displaying the authentication reply on a display screen.

Another set of embodiments provides systems that can be used for authentication, including without limitation systems implementing the methods of the invention. Some systems, for example, may be used for authenticating a user. An exemplary system can comprise a computer with a processor and instructions executable by the processor to receive a request for authentication and/or transmit an authentication code related to the request for authentication. (The authentication code may also be generated by the computer.) In particular embodiments, the system can further comprise a device configured to receive the authentication code, derive an authentication reply (e.g., from the authentication code), and/or provide the authentication reply to a user. Hence, the user may use the authentication reply to authenticate with the computer. The device, which may include without limitation any of the stand-alone devices described above, may be configured to receive the authentication code via user input and/or to receive the authentication code directly from the computer.

Another exemplary system for authenticating a user may comprise a computer. The computer may comprise a processor and instructions. The instructions may be executable by the processor to receive a request for authentication, transmit an authentication code related to the request for authentication, receive a password related to the request for authentication and/or authenticate a user. In accordance with some embodiments, the system may further comprise a second computer and/or a device (which may be a stand-alone device). The device may be in electrical communication with the first computer, the second computer, both, or neither. The device may be configured to receive the authentication code, derive an authentication reply from the authentication code and/or provide the authentication reply to the user. The second computer may comprise a processor and instructions executable by that processor to submit a request for authentication for reception by the first computer, accept from the user a password derived from the authentication reply, and/or submit the password for authentication by the first computer.

Yet another set of embodiments provides devices that can be used in authenticating an entity and/or that implement methods of the invention. An exemplary device for facilitating the authentication of an entity (including without limitation a user, etc.) by a computer system comprises a processor and instructions. The instructions may be executable by the processor to receive an authentication code, derive (perhaps from the authentication code) an authentication reply, and/or provide the authentication code to the entity, such that a password derived from the authentication reply may be used to authenticate the entity on a computer system. The device may be a stand-alone device, as described above, and/or the instructions may be embodied in a Java midlet.

A further set of embodiments provides software programs and/or applications that can be used in the authentication of an entity, including without limitation applications comprising instructions to perform methods of the invention. Merely by way of example, one program, which can be embodied on a computer readable medium, can comprise instructions executable by a computer to receive a request for authentication, transmit an authentication code (perhaps for reception by a stand-alone device), receive a password derived from the authentication code, and/or authenticate an entity based on the password. The program may comprise further instructions executable by the computer to generate the authentication code.

In accordance with other embodiments, a software program, which may be a Java midlet, can comprise instructions executable by a device (such as a stand-alone device, etc.) to receive an authentication code, derive an authentication reply from the authentication code, and/or provide the authentication reply to an entity desiring authentication. In yet further embodiments, a software program can comprise instructions executable by a computer to transmit a request for authentication for reception by a second computer, accept a password from an entity desiring authentication (the password may be derived from the authentication reply) and/or transmit the password for reception by the second computer.

Any of these software programs may be embodied on a computer readable medium. In a particular set of embodiments, a software application may include a plurality of programs (including without limitation the programs described above) as software components. Each of the software components may be executable by a computer and/or devices, as appropriate, in accordance with various embodiments of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

1. Overview

Figure 1:
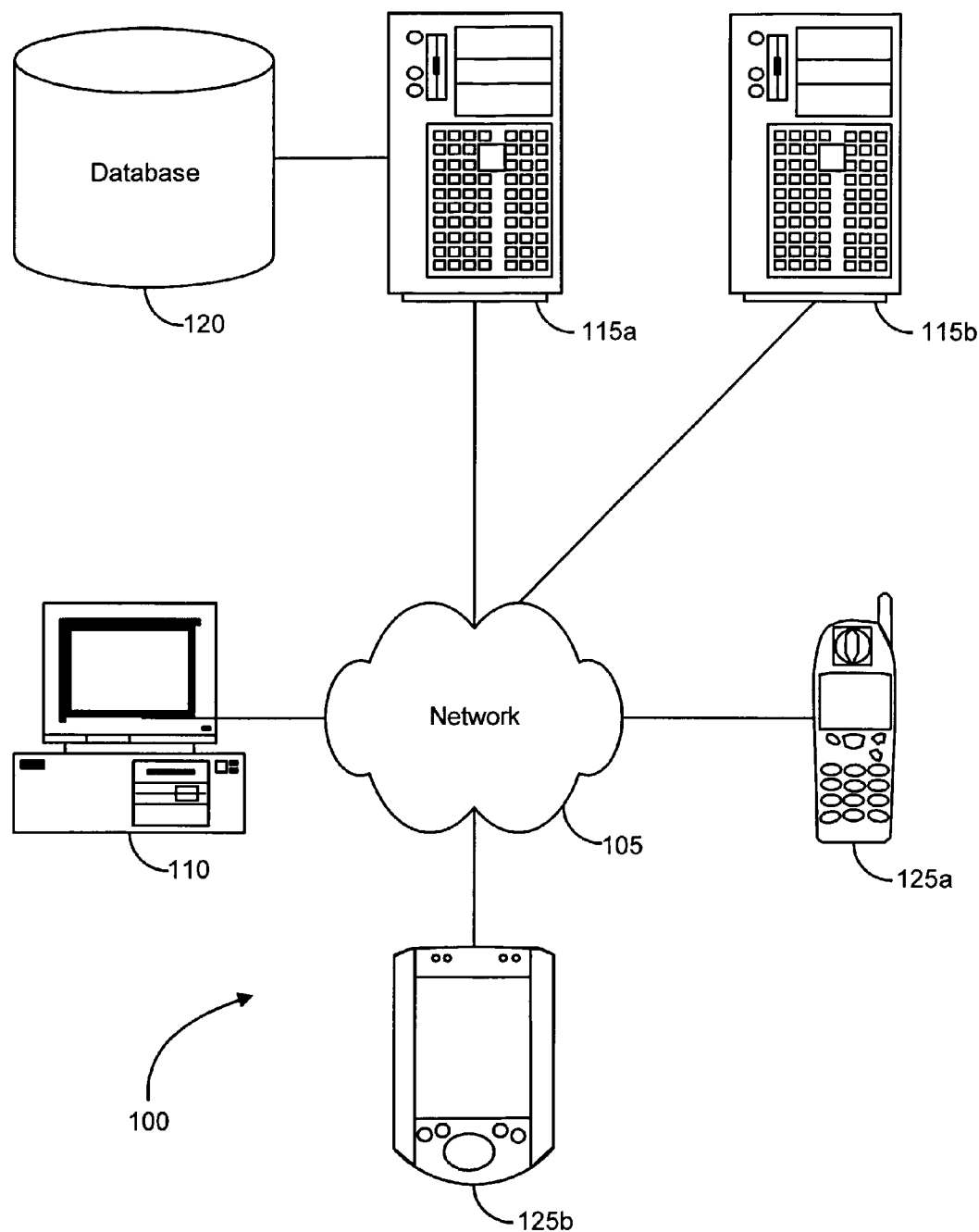
FIG. 1 illustrates a system for authenticating an entity, in accordance with various embodiments of the invention.

Various embodiments of the invention, therefore, provide enhanced authentication solutions, including without limitation methods, devices, systems and software programs for authenticating an entity and/or for facilitating such authentication. In accordance with certain embodiments, an entity (such as a user, a computer, etc.) may attempt to authenticate in order to use a resource (such as a server, an application, etc.). Merely by way of example, the entity may provide a username or some other identifier to a computer responsible for authenticating the entity. In response, the authenticating computer may transmit a challenge, such as an authentication code. In particular embodiments, the challenge may be used to derive an authentication reply, which in turn may be used to derive and/or create a password (in one set of embodiments, the authentication reply itself may be the password). The derivation of the authentication reply may also require the user to provide some sort of identification, such as a personal information code ("PIC"), biometric verification, etc. The password then may be supplied to the authenticating computer, which can, in some cases, use the username and the password to authenticate the entity.

Based on the disclosure herein, one skilled in the art will understand that various embodiments of the invention may be used to authenticate a variety of entities in a computer environment, including without limitation, human users, computers (including, inter alia, client computers in a client-server environment, peer computers in a peer-to-peer environment, etc.), applications (including, for example, client applications, web browsers, etc.), and/or groups of the same. For ease of description, the exemplary embodiments discussed below refer generally to the authentication of users, but it should be understood that similar embodiments may be implemented to authenticate any appropriate type of entity.

The discussion below sometimes refers to an "authenticating computer," which should be interpreted to mean any computer that is used to identify and/or validate a user (or any other appropriate entity) to access and/or use a particular resource. In some cases, the authenticating computer may be the computer on which the resource resides. In other cases, however, the authenticating computer may simply authenticate an entity to use resources on one or more other computers, such as, for example, when the authenticating computer acts as a domain server and/or domain controller (a concept familiar to those skilled in the art). Moreover, while the functions ascribed below to an authenticating computer are described with respect to a single computer, various embodiments can segment these functions as appropriate among a plurality of computers and/or processors. Merely by way of example, one computer may accept input (such as a username and/or password), while another computer may generate an authentication code. In this example, either (or both) of these computers (and/or a third computer) may actually perform the authentication of the entity based on the submitted username and password.

The term "resource" refers to any computing resource (including without limitation, an operating system; an application; a storage medium; such as a hard drive, etc.; a web site; an online account, including for example, an account with a merchant, bank; etc.). In some cases, access to a resource may be controlled, such that an entity desiring access to the resource must be identified, e.g., by a username, as authorized to access the resource. In particular cases, such identification is authenticated, e.g., through the use of a password.

Hence, the discussion of exemplary embodiments generally refers to the terms "username" and "password" as the standard components of the described authentication models. These terms, as used herein, should be interpreted in a broad sense. Merely by way of example, the term "username" means any type of identifier that can be used (e.g., by an authenticating computer) to identify an entity. The username may correspond to a hostname, the name on an computer account, a login name, an application username, etc. Correspondingly, the term "password" is used to refer generally to any string of characters, etc. that can be used as a cross-reference to authenticate, verify, etc. that an entity submitting the username is in fact authorized to access a resource with the privileges of the entity identified by the username. In some specific embodiments, the term "password" is used in particular to describe a string of characters, etc. generated by the methods of the invention, as described in more detail below.

The discussion herein also refers to an "user computer" as the computer used by the user to provide username and password information (and, in many cases, the computer used to access the resource(s) for which authentication is required). It should be noted, however, that although the term "user computer" is used for ease of description, one should not infer from the term "user computer" that a user necessarily will be involved in all embodiments of the invention. In particular embodiments, the user computer may itself be the entity requesting authentication, perhaps on behalf of a user. In other embodiments, there may be no user involved; merely by way of example, an automated process running on the user computer may need access to a particular resource. Thus, the user computer may be a personal computer, network client, server, etc. as appropriate. In some cases, the user computer may in fact be the same computer as the authenticating computer (e.g., a user may login to a console on the authenticating computer).

In some embodiments, a "stand-alone device" may be used to facilitate the authentication process. As used herein, the term "stand-alone" means only that this device is a device separate from the authenticating computer and the access computer. The stand-alone device, therefore, can be any device capable of performing the functions ascribed to such a device, and may be a dedicated device (such as a hardware token) and/or a properly-configured general-purpose device (such as a personal digital assistant ("PDA"), wireless telephone, PC, etc.). The capabilities and features of the stand-alone device are described in detail below.

2. Exemplary Embodiments

As mentioned above, embodiments of the invention include devices, systems, methods and software that can be used to authenticate an entity (e.g., a user) and/or to facilitate the authentication process. One set of embodiments provides systems for authentication, such as the exemplary system 100 illustrated by FIG. 1. The system 100 may operate in a networked environment, and therefore may comprise a network 105. The network 105 may be any type of network familiar to those skilled in the art that can support data communications using any of a variety of commercially-available protocols, including without limitation TCP/IP, SNA™, IPX™, AppleTalk™, and the like. Merely by way of example, the network 105 may be a local area network ("LAN"), such as an Ethernet network, a Token-Ring™ network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 100 also can include one or more user computers (e.g. 110) which may be used to access a desired resource and/or to request authentication (e.g., in order to gain access to that resource). The user computer 110 can be a general purpose personal computer (including, merely by way of example, a personal computer and/or laptop computer running various versions of Microsoft Corp.'s Windows™ and/or Apple Corp.'s Macintosh™ operating systems) and/or workstation computers running any of a variety of commercially-available UNIX™ or UNIX-like operating systems (including without limitation the variety of available GNU/Linux operating systems). The user computer 110 may also have any of a variety of applications, including one or more development systems, database client and/or server applications, and/or web browser applications. In particular, the user computer 110 may feature the necessary software to request authentication in accordance with methods of the invention. In alternative embodiments, the user computer 110 may be any other electronic device, such as a thin-client computer, Internet-enabled mobile telephone, and/or personal digital assistant, capable of communicating via a network (e.g., the network 105) and/or displaying and navigating web pages or other types of electronic documents. Although the exemplary system 100 is shown with one user computer, any number of user computers may be supported.

The system may also include one or more server computers 115, which can be general purpose computers and/or specialized server computers (including, merely by way of example, PC servers, UNIX servers, mid-range servers, mainframe computers rack-mounted servers, etc.). One (or more) of the servers (e.g., 115a) may be dedicated to controlling access to a group of servers (e.g., 115) and/or resources, and therefore may perform some or all of the authentication procedures described below. Another server (e.g., 115b) may be dedicated to running an application, such as a database application (e.g., the Oracle 10 g RDBMS), a business application, a web server, etc., and/or providing access to a resource. In some embodiments, therefore, one server 115a may act as an authenticating computer, and the other server 115b may provide access to desired resources once authentication has been completed. Alternatively, a single server could both perform authentication and provide access to resources. Moreover, as noted above, various authentication procedures may be distributed among a plurality of authenticating computers (which may be, but need not be, servers as described herein). Such servers 115 may be used to process requests (including authentication requests) from the user computer 110. (It should be noted that, while certain embodiments of the invention feature a server as the authenticating computer, the authenticating computer need not be a server; any computer with appropriate hardware and/or software for performing the methods described below can function as an authenticating computer.)

Each of the servers 115 can feature an operating system including any of those discussed above, as well as any commercially-available server operating systems. As appropriate, one or more of the servers 115 can also run any of a variety of server applications and/or mid-tier applications, including HTTP servers, FTP servers, CGI servers, database servers, Java servers, business applications, and the like. The server(s) also may be one or more computers that are capable of executing programs or scripts in response to the user computer 110. As one example, a server may execute one or more web applications. A web application may be implemented as one or more scripts or programs written in any programming language, such as Java™, C, C#™ or C++, and/or any scripting language, such as Perl, Python, or TCL, as well as combinations of any programming/scripting languages. Such web applications may provide authentication services and/or perform procedures in accordance with methods of the invention. The server(s) may also provide database services, including without limitation those commercially available from Oracle™, Microsoft™, Sybase™, IBM™ and the like, which can process requests from database clients running on a user computer 110. Those skilled in the art will recognize that the functions described with respect to various types of servers may be performed by a single server and/or a plurality of specialized servers, depending on implementation-specific needs and parameters.

In some cases, the software for performing methods of the invention (and/or certain components thereof) may be incorporated within any of these services. Merely by way of example, an RDBMS may include the necessary components to allow a computer (such as a server 115) operating the RDBMS to act as an authenticating computer. As another example, the authentication services may be provided in a set of CGI scripts. In other embodiments, the authentication services may be provided by a freestanding application and/or by the operating system itself. Those skilled in the art will appreciate, based on the disclosure herein, that there are a wide variety of ways in which the authentication methods described below may be implemented within the scope of the invention.

The system 100 may also include one or more databases 120. The database(s) 120 may reside in a variety of locations. By way of example, a database 120 may reside on a storage medium local to (and/or resident in) one or more of the computers 110, 115. Alternatively, it may be remote from any or all of the computers, and/or in communication (e.g., via the network 105) with one or more of these. In a particular set of embodiments, the database 120 may reside in a storage-area network ("SAN") familiar to those skilled in the art. Similarly, any necessary files for performing the functions attributed to the computers 110, 115 (as well as the stand-alone devices 125, described below) may be stored locally on the respective computer/devices and/or remotely, as appropriate. In one set of embodiments, the database 120 may be a relational database, such as Oracle 10g™, that is adapted to store, update, and retrieve data in response to SQL-formatted commands. The database 120 may store data necessary to implement the methods of the invention, including without limitation, a table of user tokens and/or passcodes (each of which are discussed below), data about past authentication attempts (such as, for example, past authentication codes, previous unsuccessful attempts, etc.), in order to provide enhanced authentication security. Merely by way of example, each authentication code used by the system 100 may be stored in the database 120, so that it is not used in the future, thereby ensuring that each authentication code is used only one time.

In accordance with some embodiments, the system 100 can include a stand-alone device 125, which can be, inter alia, a wireless phone 125a, a PDA 125b, etc. In particular embodiments, the standalone device can feature a run-time environment, such as the Java™ environment first developed by Sun Microsystems™, and/or an application configured to perform certain procedures in accordance with methods of the invention. Merely by way of example, a stand-alone device may feature a Java "midlet" that is configured to accept as input an authorization code and provide as output an authorization reply, as described in more detail below. In other embodiments, this functionality may be implemented in firmware and/or hardware (as in the case of a dedicated hardware token, for example).

The stand-alone device may be in electrical communication with other system components (i.e., the stand-alone device may exchange data electronically in any suitable manner—e.g., via a network such as the network 105 described below, via wireless communication, etc.—with such components). Alternatively, the stand-alone device may not be in electrical communication with other system components, such that the stand-alone device cannot exchange data with such components directly; in these embodiments, data to be exchanged may be input by a user and/or output to the user (e.g., by displaying the data on a display, etc.), who thus can serve as an interface to other system components. Hence, in some embodiments, the stand-alone device 125 may be in electrical communication (e.g., through the network 105, a wireless network, the PSTN, etc.) with the user computer 110 and/or the servers 115, for instance, to receive an authentication code directly from a server 115.

In other embodiments, however, the stand-alone device may not need to be in electrical communication with any other system components (and, indeed, to enhance security, it may be desirable in some cases to avoid any electronic communication between the stand-alone device and other system components). In particular embodiments, therefore, the stand-alone device 125 may feature an input interface, such as a keyboard, touchscreen, etc., and/or a user may input an authentication code received from an authenticating computer using such input means. Correspondingly, the stand-alone device may also include an output interface, such as a display, printer, etc., which can be used to output an authentication reply, as described in more detail below. In some cases, it may be advantageous for the stand-alone device to be a device generally carried by users, such as a wireless telephone. Merely by way of example, those skilled in the art will appreciate that modern wireless telephones, available from Nokia Corp. as well as others, support a Java runtime environment and thus are Java-enabled. Such wireless telephones can be used as stand-alone devices to support embodiments of the invention, and software components for implementing methods of the invention may be executed in the Java runtime environment, for example as Java applets and/or midlets.

Figure 2:
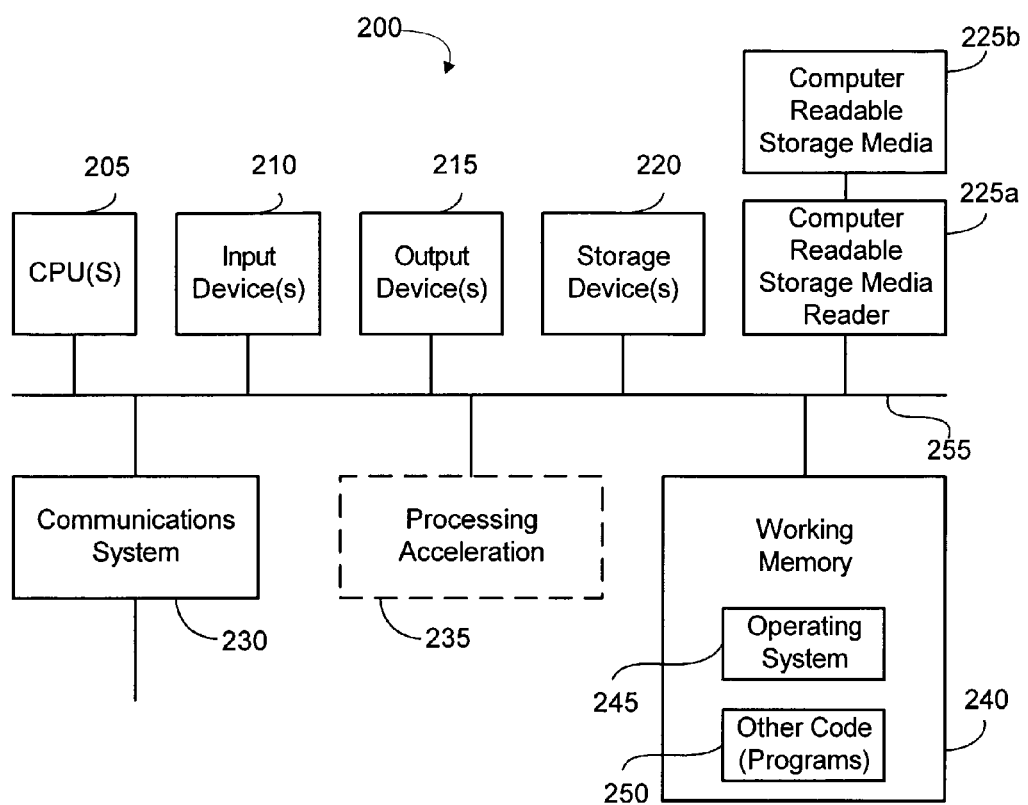
FIG. 2 is a generalized schematic diagram illustrating a computer system that may be used in accordance with various embodiments of the invention.

As noted above, in accordance with certain embodiments, standard computers/devices may be configured for use in the system 100. FIG. 2 provides a general illustration of one embodiment of a computer system 200, which may be exemplary of any of the computers/devices described above. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a; a communications system 230 (e.g., a modem, a network card (wireless or wired), an infra-red communication device, etc.); and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 105 and/or any other computer described above with respect to the system 100.

The computer system 200 may also comprise software elements, shown as being currently located within a working memory 240, including an operating system 245 and/or other code 250, such as an application program (which may be a an application, midlet, etc., configured to perform and/or facilitate authentication and/or other procedures in accordance with embodiments of the invention, as well as client applications, web browsers, mid-tier applications, RDBMS, etc.). The application programs may be designed to implement methods of the invention.

Figure 3:
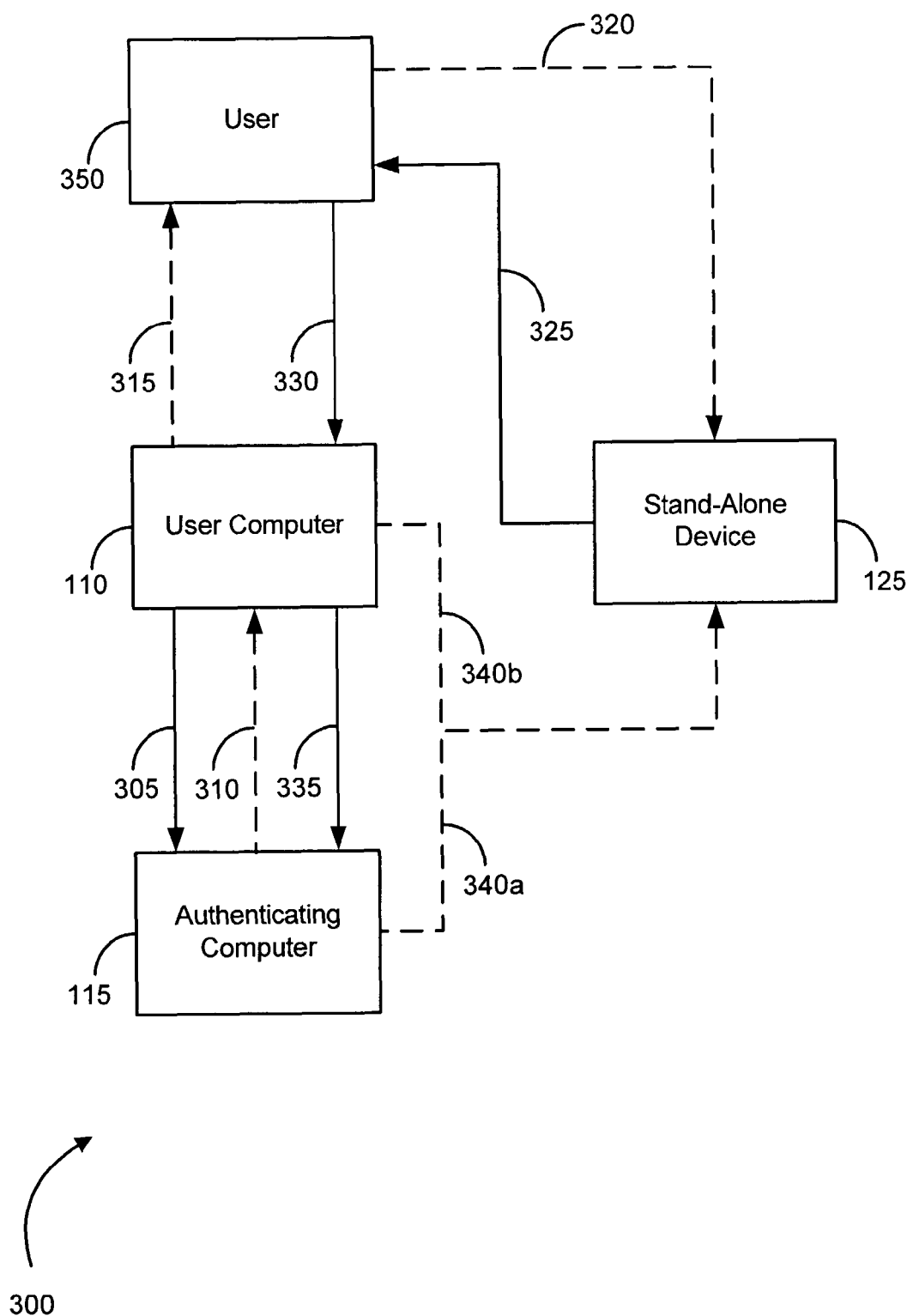
FIG. 3 is a block diagram illustrating an authentication transaction in accordance with various embodiments of the invention.

It should be appreciated that alternate embodiments of a computer system 200 may have numerous variations from that described above. For example, customized hardware might also be used and/or particular elements might be implemented in hardware, software (including portable software, such as applets and/or midlets), or both. Further, connection to other computing devices such as network input/output devices may be employed.

FIG. 3 depicts an authentication transaction 300 in accordance with certain embodiments of the invention, providing an illustration of how a system, which might be the system 100 of FIG. 1 might operate to authenticate an entity (e.g., a user, etc.). A user computer 110 first makes an authentication request 305 to an authenticating computer 115. The authentication request might be, for instance, the entry of a username. Alternatively, the authentication request might be a "login" command, the execution of an application for which authentication is required, an attempt to access a storage medium, etc. (and/or a combination of any of these).

In one set of embodiments, the authentication computer 115 might respond by issuing a challenge 310 to the user computer 110. In some cases, as described in more detail below, the challenge 310 comprises an authentication code. In this set of embodiments, the user computer 110 provides 315 the authentication code (or other challenge) to the user 350, e.g., by displaying the challenge. The user 350 then inputs 320 the received authentication code into the stand-alone device 125. The stand-alone device 125 is configured to derive from the authentication code an authentication reply, which it then provides 325 to the user 350 (e.g., by display, printout, etc.). The user then inputs 330 this authentication reply (and/or a password derived from the authentication reply, as described in more detail below) into the user computer 110 (e.g., by typing the authentication reply/password into a "password" dialog box). The authentication reply/password is then transmitted 335 to the authenticating computer 115, where it is used to authenticate the user 350.

Another set of embodiments functions similarly, except that the stand-alone device 125 may be in communication with the user computer 110 and/or the authenticating computer 115. If the stand-alone device is in communication with the authenticating computer 115, the authenticating computer 115, instead of transmitting the challenge to the user computer 110, may instead transmit 340a the challenge directly to the stand-alone device 125. Alternatively, if the user computer 110 is in communication with the stand-alone device 125, the user computer 110, instead of providing the challenge to the user 350, may instead transmit 340b the challenge directly to the stand-alone device 125. In either case, the stand-alone device 125 may generate and/or provide an authentication reply as described above.

Any of these methods of transmitting the challenge from the authenticating computer 115 to the stand-alone device 125 (through the user computer 110 and user 350, through the user computer 110 only, or directly to the stand-alone device) can be considered a transmission of the challenge for reception by the stand-alone device 125.

Figure 4:
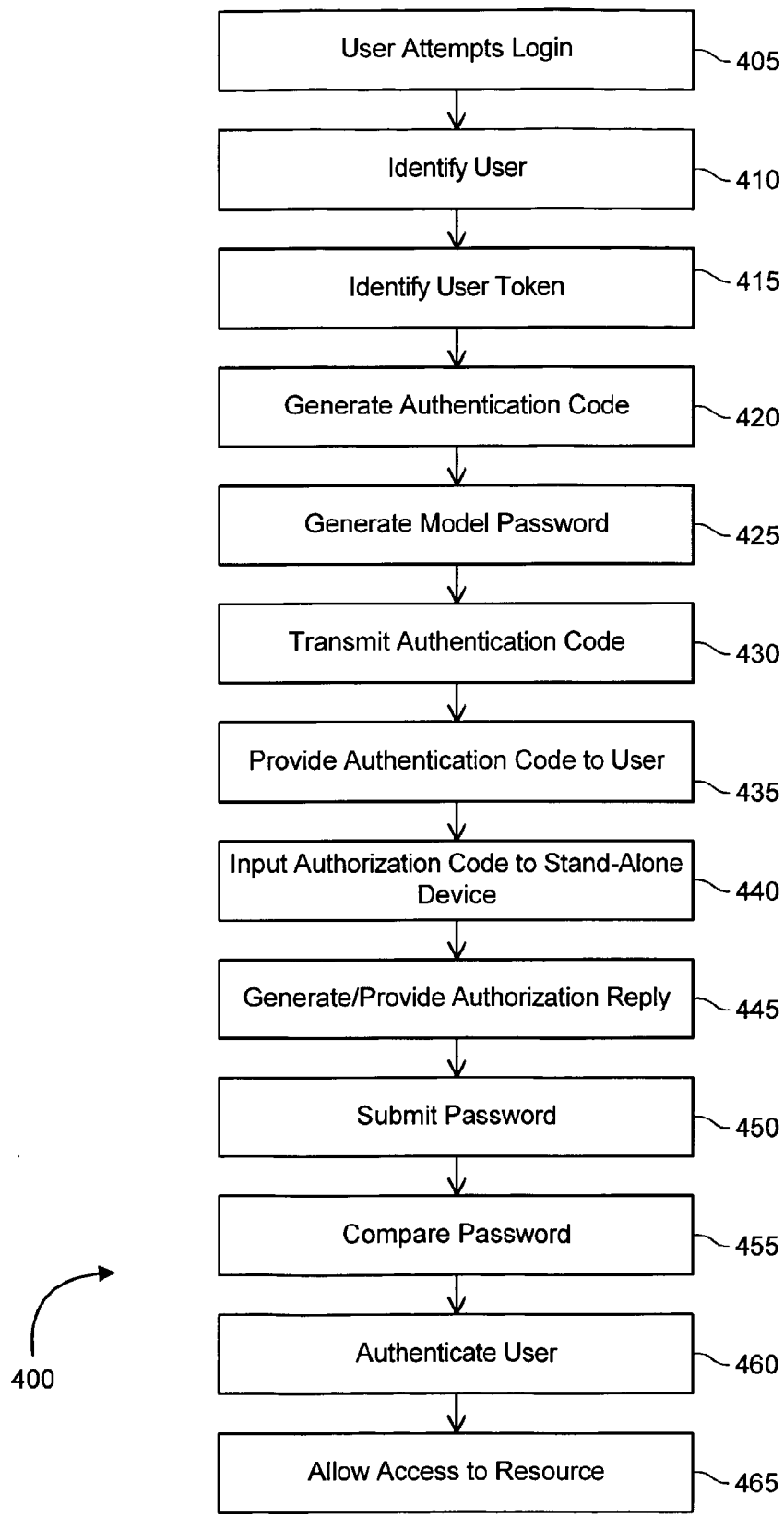
FIG. 4 is a process flow diagram illustrating a method of authenticating an entity in accordance with various embodiments of the invention.

The transaction 300 described with respect to FIG. 3 may be accomplished by a variety of methods. Merely by way of example, FIG. 4 illustrates an exemplary method 400 that may be used to perform the transaction 300. It should be noted, however, that embodiments exemplified by this method 400 are not limited to any structural or functional implementation, and that systems and/or transactions different from those illustrated in FIGS. 1-3 may perform methods of the invention, including certain methods exemplified by the method 400 of FIG. 4.

In accordance with the method 400, when a user (or any other entity) attempts a login (block 405), and/or makes any other type of authentication request, the user is identified (block 410), usually by an authenticating computer. Procedures for identifying a user are well known in the art, and can include, merely by way of example, searching a table of usernames for an entry matching a submitted username, etc.

Based on the identity of the user, a user token may be identified (block 415). A user token can be a value that is associated with that user; in accordance with particular embodiments, each user is associated with a unique user token. Merely by way of example, in some cases, an authenticating computer will store a unique string of characters associated with each user, and identifying the user token can comprise extracting that string from its stored location. In certain embodiments, each user token will correspond to a serial number of a hardware token and/or of a software application resident on a stand-alone device. On the authenticating computer, user tokens may be stored in an encrypted file, a hash, and/or any other form that is not susceptible to unauthorized access. In some embodiments, for example, user tokens may be stored in much the same way that passwords are traditionally stored. The user token is also generally stored on the system component responsible for deriving an authentication reply (such as a stand-alone device, etc.). On the stand-alone device, the user token may be stored in hardware, firmware, etc. and/or may be compiled into or otherwise securely stored in a software program. In particular embodiments, as mentioned above, the user token may be (or correspond to) a serial number for such software and/or hardware.

The method 400 can further include the generation of an authentication code (block 420). The authentication code can be any "seed" value that, when combined with the user token in a particular manner, will provide a model password. Generation of the authentication code can take any appropriate form; merely by way of example, a pseudorandom number generator may be used to generate the authentication code. Optionally, steps can be taken to ensure that the authentication code has not been used before (e.g., by consulting a table of prior authentication codes), in order to provide for "one time passwords." (In addition, the generated authentication code may be added to such a table, to prevent its use in the future.) Hence, a model password may be generated (block 425), e.g., by combining the user token with the authentication code in a specified manner, and/or stored temporarily at the authenticating computer (generally in a relatively secure fashion). In some cases, the procedure for generating the model password will match the process used to create an authentication reply (an example of which is described below with respect to FIG. 5), accounting for any modification of the authentication reply to create the password, if applicable (The variety of possible relationships between an authentication reply and a password is discussed in more detail below.).

The authentication code may then be transmitted (block 430). As discussed above, the authentication code may be transmitted directly to the stand-alone device (e.g., if the stand-alone device is in electrical communication with the authenticating computer), to the stand-alone device via a user computer (e.g., if the stand-alone device is in electrical communication with the user computer). As noted above, in some circumstances (e.g., for enhanced security and/or to minimize the cost of the stand-alone device and/or other system components), it may be desirable for the stand-alone device not to be in electrical communication with either of the user computer or the authenticating computer, in which case the authentication code may be transmitted electronically only to the user computer. Hence, the method can include, as appropriate, providing the authentication code to the user (block 435) (e.g., by displaying the authentication code on popup window, as part of a login dialog box, etc.). Once the user has been provided the authentication code, the user may input the authorization code to the stand-alone device (block 440), e.g., by using a keyboard, telephone keypad, touchscreen, etc.

Figure 5:
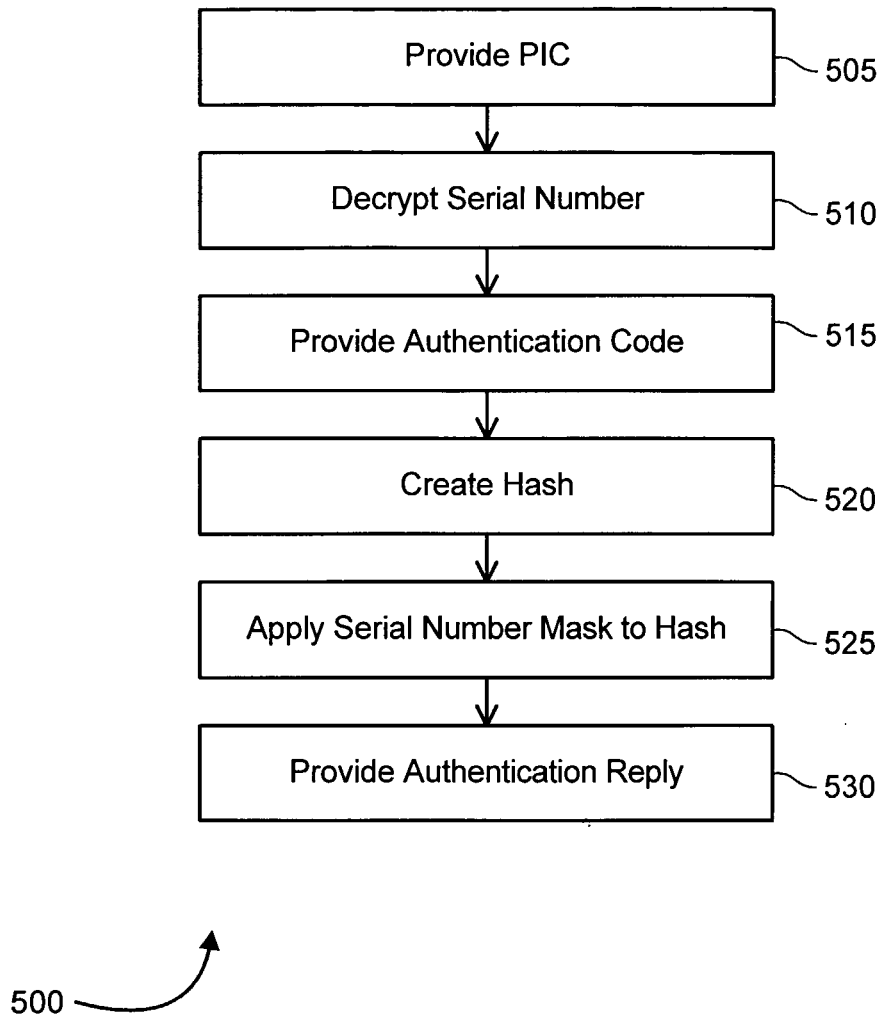
FIG. 5 is a process flow diagram illustrating a method of deriving an authentication reply in a accordance with various embodiments of the invention.

Based on the input authorization code, an authorization reply can be generated by the stand-alone device (and/or another system component) and/or provided to the user (block 445), e.g., by displaying the authorization reply on a display, etc. FIG. 5 illustrates an exemplary method 500 of generating an authorization reply. As noted above, in accordance with some embodiments, a model password may be generated by combining (in some fashion) an authentication code with a user token, which can be, for example, a serial number (or some other unique identifier) associated with a stand-alone device. Based on this disclosure, one skilled in the art will appreciate that the serial number/identifier generally will be securely stored on the stand-alone device, and in fact the device itself (and/or software resident on the device, as in the case of a wireless phone, PDA, etc.) may be protected against unauthorized use by some sort of identifying information, such as a personal identification code ("PIC") and/or some other means (which could include, for example, biometric identification, etc.). The user, therefore, can provide the necessary information to access the stand-alone device (and/or the necessary software on the stand-alone device) (block 505). In particular embodiments, this information (e.g., the PIC) can serve as an encryption key for the stand-alone device's serial number, e.g., using any of several known encryption methods, such that the provision of the identifying information allows for the decryption of the stand-alone device's serial number (block 510). Merely by way of example, a hash value (which may be created using an MD5 hash function, an SHA-1 hash function, an SHA-256 hash function, an SHA-384 hash function, an SHA-512 hash function and/or any of several other known hash functions) of the PIC may be used as a key to decrypt the serial number.

The method 500 can also include providing the authentication code to the stand-alone device (or any other component responsible for creating an authentication reply (block 515). The authentication code can be provided in any appropriate way. Merely by way of example, in cases where the stand-alone device is not in electrical communication with the authenticating computer and/or the user computer, the authentication code may be input by the user (e.g., via a keyboard, touchscreen, etc.). Alternatively, the authentication code may be received by the stand-alone device directly from the authenticating computer and/or the user computer, depending on the system configuration.

Once the authentication code has been provided to the stand-alone device (or whatever component generates the authentication reply), a hash value may be created (block 520), using any appropriate hashing algorithm (including without limitation those described above). Merely by way of example, a hash may be created by concatenating (or otherwise combining) the serial number and the authorization code, and/or by deriving a hash value from the combined value. This hash value can serve as the authentication reply in some implementations. Optionally, a mask value may be derived from the serial number (using techniques known in the art), and/or this mask may be applied to the hash of the combined serial number/authentication code (block 525). In some cases, the value resulting from the masking procedure may be used as the authentication reply, so that, for example, it would be impossible to derive the serial number from the authentication reply if the authentication reply were somehow intercepted in transmission. The authentication reply then can be provided to the user (block 530), for example by displaying the authentication reply, etc.

Hence, FIG. 5 illustrates an exemplary method of deriving an authentication reply from an authentication code. Those skilled in the art will appreciate, based on the disclosure herein, that a variety of alternative methods could be used to derive an authentication reply from an authentication code and/or serial number, and that any of such methods may be used in accordance with embodiments of the invention. Returning now to FIG. 4, when the authentication reply has been derived (by whatever procedure), a password may be submitted (e.g., to the authenticating computer) (block 450). The procedure for submitting the password is discretionary; merely by way of example, the user may type the password into a field in a login window, etc. on the user computer, and/or the user computer may transmit the password to the authenticating computer.

In many embodiments, the password is derived from the authentication reply. The derivation of the password from the authentication reply may be accomplished in several ways. Merely by way of example, in the simplest case, the password can be the authentication reply itself. In other cases, the password may comprise the authentication reply and an appended passcode known to the user (in which case the authenticating computer would generally take the appended passcode into account when generating a model password). Based on the disclosure herein, one skilled in the art will appreciate that the password may correspond to the authentication reply in a variety of ways, in accordance with different embodiments of the invention.

At block 455, the submitted password may be compared with the model password. As noted above, in some instances, the process for generating the model password on the authenticating computer will match the process for generating the authentication reply and/or the submitted password. For example, in the case in which the authentication reply is derived in accordance with the method of FIG. 5 and submitted as the password, the model password likely will have been generated by performing a hashing/masking operation similar to that performed in the generation of the authentication reply, and the (possibly masked) hash value generated by the authenticating computer will be compared to the submitted password. In other cases, for example, in which the derivation of the password from the authentication reply comprises concatenating a passcode with the authentication reply, the comparison of the password with the model password can comprise stripping the concatenated passcode from the password (e.g., to reveal the password, which may be authentication reply itself) and then comparing the revealed password with the model password. (A variety of well-known comparison techniques may be implemented.) The user may then be authenticated (block 460) (e.g., by determining that the submitted password matches the model password). Once the user (or other entity) is authenticated, that entity may be allowed access to the desired resource (block 465).

It should be noted that the methods discussed with respect to FIGS. 4 and 5 are intended to be only exemplary in nature. Consequently, various embodiments may omit, substitute and/or add various procedures as appropriate. Merely by way of example, while the discussion above describes how the model password may be generated prior to receiving the submitted password, in other embodiments, other embodiments might generate the model password after the submitted password has been received, and/or the generated model password may then be compared to the submitted password. Alternatively, depending on the techniques used, there may be no need to prepare a model password; for instance, although one skilled in the art will recognize, based on the disclosure herein, that the hashing techniques discussed above may not always be reversible to produce the values that were hashed, certain methods may implement a reversible calculation to define the relationship between the user token and the authentication code (and, correspondingly, between the authentication code and the authentication reply), such that authenticating the user can comprise performing an inverse calculation on the authentication reply, such that the result of the inverse calculation can be performed to reveal whether the authentication reply was derived from the user token (e.g., the serial number of the stand-alone device). Other variations are possible as well.

Similarly, in the foregoing description, for the purposes of illustration, various methods were described in a particular order. It should be appreciated that in alternate embodiments, the methods may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, and/or other types of machine-readable media suitable for storing electronic instructions. Merely by way of example, some embodiments of the invention provide software programs and/or components, which may be executed on one or more computers, for performing the methods described above. In particular embodiments, for example, there may be a plurality of software components configured to execute on various hardware devices (such as an authentication computer, a user computer, a stand-alone device, etc.). Alternatively, the methods may be performed by a combination of hardware and software.

Hence, various embodiments of the invention provide inventive methods, systems and software products for providing and/or facilitating authentication of users and/or other entities. The description above identifies certain exemplary embodiments for implementing the invention, but those skilled in the art will recognize that many modifications and variations are possible within the scope of the invention. The invention, therefore, is defined only by the claims set forth below.

What is claimed is:

1. A method of authenticating an entity, the method comprising:
    sending an authentication request from a computer of a user to an authentication computer, the authenticating request comprising a request for an action that requires authentication of an entity by the authentication computer;
    receiving at the computer of the user an authentication code from the authenticating computer in response to the authentication request from the computer of the user to the authentication computer, wherein the authentication code comprises a unique value provided to the computer of the user as a challenge to the request for the action that requires authentication;
    transmitting the authentication code from the computer of the user to a mobile device of the user;
    receiving at the computer of the user an authentication reply derived by mobile device of the user from the authentication code, wherein the authentication reply comprises a value derived from the authentication code but different from the authentication code;
    deriving with the computer of the user a password based on the authentication reply, wherein the password comprises a one-time password for the requested action derived from the authentication reply; and
    transmitting the password from the computer of the user to the authenticating computer to authenticate the entity based on the password.

2. A method of authenticating an entity as recited in claim 1, wherein the entity is a user.

3. A method of authenticating an entity as recited in claim 1, wherein the entity is a computer.

4. A method of authenticating an entity as recited in claim 1, wherein the entity is a software application.

5. A method of authenticating an entity as recited in claim 1, the method further comprising:
    generating the authentication code with the authentication computer based on the request for authentication.

6. A method of authenticating an entity as recited in claim 1, the method further comprising:
    receiving the authentication code at the mobile device of the user; and
    the mobile device of the user deriving an authentication reply from the authentication code, wherein the password is derived from the authentication reply.

7. A method of authenticating an entity as recited in claim 1, the method further comprising:
    generating at the authentication computer a model password based on the authentication code;
    wherein authenticating the entity comprises comparing the password from the computer of the user with the model password.

8. A method of authenticating an entity as recited in claim 1, wherein the mobile device of the user is a wireless telephone.

9. A method of authenticating an entity as recited in claim 1, wherein the mobile device of the user is a personal digital assistant.

10. A method of authenticating an entity as recited in claim 1, wherein the mobile device of the user is a personal computer.

11. A method of authenticating an entity as recited in claim 1, wherein the mobile device of the user is Java-enabled.

12. The method of claim 1, wherein deriving the authentication reply comprises:
    combining a serial number of the mobile device of the user and the authentication code; and
    creating a hash value from the combined serial number and authentication code.

13. A method of authenticating an entity as recited in claim 6, wherein the authentication reply is the password.

14. A method of authenticating an entity as recited in claim 6, wherein the password comprises the authentication reply.

15. A method of authenticating an entity as recited in claim 6, wherein the authentication code is received by the computer of the user directly from the authentication computer.

16. A method of authenticating an entity as recited in claim 6, wherein the authentication code is received by the computer of the user from the user.

17. The method of claim 12, wherein deriving the authentication reply comprises:
    deriving a mask from the serial number; and
    applying the mask to the hash value to create a masked hash value.

18. A method of facilitating the authentication of an entity, the method comprising:

receiving at a mobile device of a user from a computer of the user an authentication code from an authenticating computer system, wherein the authentication code is provided to the computer of the user by the authenticating computer system in response to a request for authentication made to the authenticating computer system from the computer of the user, wherein the authentication code comprises a unique value provided to the computer of the user as a challenge to the request for the action that requires authentication;

deriving with the mobile device of the user from the authentication code an authentication reply, wherein the authentication reply comprises a value derived from the authentication code but different from the authentication code; and providing the authentication reply from the mobile device of the user to an entity, wherein the authentication reply is used by the computer of the user to derive a password for authenticating the entity on the authenticating computer system, wherein the password comprises a one-time password for the requested action derived from the authentication reply.

19. A method of facilitating the authentication of an entity as recited in claim 18, wherein deriving the authentication reply comprises:
receiving a personal information code from the entity;
decrypting a user token;
receiving an authentication code; and
deriving the authentication reply with the user token.

20. A method of facilitating the authentication of an entity as recited in claim 18, wherein deriving the authentication reply with the user token comprises:
combining the user token and the authentication code; and
creating a hash value from the combined user token and authentication code.

21. A method of facilitating the authentication of an entity as recited in claim 18, wherein providing the authentication reply comprises displaying the authentication reply on a display screen.

22. A method of facilitating the authentication of an entity as recited in claim 20, wherein deriving the authentication reply with the user token further comprises:
deriving a mask from the user token; and
applying the mask to the hash value to create a masked hash value.

23. A method of authenticating an entity, the method comprising:
sending an authentication request from a computer of a user to an authentication computer, the authenticating request comprising a request for an action that requires authentication of an entity by the authentication computer;
receiving at the authenticating computer the request for authentication of the entity;
generating with the authenticating computer an authentication code related to the request for authentication, wherein the authentication code comprises a unique value provided to the computer of the user as a challenge to the request for the action that requires authentication;
transmitting the authentication code from the authentication computer to the user computer;
receiving the authentication code from the authentication computer at the user computer;
providing the authentication code from the computer of the user to a mobile device of the user;
receiving the authentication code from the computer of the user with the mobile device of the user;
deriving at the mobile device of the user an authentication reply from the authentication code, wherein the authentication reply comprises a value derived from the authentication code but different from the authentication code;
providing the authentication reply from the mobile device of the user to the computer of the user;
receiving at the computer of the user the authentication reply from the mobile device of the user;
deriving at the computer of the user a password from the authentication reply, wherein the password comprises a one-time password for the requested action derived from the authentication reply;
providing the password derived from the authentication reply from the computer of the user to the authentication computer;
receiving at the authenticating computer password derived from the authentication reply; and
authenticating the entity with the authentication computer based on the password.

24. A system for authenticating a user, the system comprising:
a computer of a user comprising a processor and instructions executable by the processor to:
send an authentication request, the authenticating request comprising a request for an action that requires authentication of an entity;
receive an authentication code in response to the authentication request, wherein the authentication code comprises a unique value provided to the computer of the user as a challenge to the request for the action that requires authentication;
transmit the authentication code;
receive an authentication reply derived from the authentication code, wherein the authentication reply comprises a value derived from the authentication code but different from the authentication code;
derive a password based on the authentication reply, wherein the password comprises a one-time password for the requested action derived from the authentication reply; and
transmit the password to authenticate the entity based on the password;
an authentication computer comprising a processor and instructions executable by the processor to:
receive the request for authentication from the computer of the user;
generate the authentication code in response to the request; and
transmit the authentication code related to the request for authentication to the computer of the user; and
a mobile device of the user configured to:
receive the authentication code from the computer of the user;
derive the authentication reply from the authentication code; and
provide the authentication reply to the computer of the user.

25. A system for authenticating a user as recited in claim 24, wherein the mobile device of the user is a wireless telephone.

26. A system for authenticating a user as recited in claim 24, wherein the mobile device of the user is configured to receive the authentication code via user input.

27. A system for authenticating a user as recited in claim 24, wherein the mobile device of the user is in communication with the computer of the user, and wherein the mobile device of the user is configured to receive the authentication code directly from the computer of the user.

28. A system for authenticating a user as recited in claim 24, wherein the instructions are further executable by the processor to:
generate an authentication code related to the request for authentication.

29. A machine-readable medium having stored thereon a series of instructions which, when executed by a processor, cause the processor to authenticate an entity by:
sending an authentication request from a computer of a user to an authentication computer, the authenticating request comprising a request for an action that requires authentication of an entity by the authentication computer;
receiving at the computer of the user an authentication code from the authenticating computer in response to the authentication request from the computer of the user to the authentication computer, wherein the authentication code comprises a unique value provided to the computer of the user as a challenge to the request for the action that requires authentication;
transmitting the authentication code from the computer of the user to a mobile device of the user;
receiving at the computer of the user an authentication reply derived by the mobile device of the user from the authentication code, wherein the authentication reply comprises a value derived from the authentication code but different from the authentication code;
deriving with the computer of the user a password based on the authentication reply, wherein the password comprises a one-time password for the requested action derived from the authentication reply; and
transmitting the password from the computer of the user to the authenticating computer to authenticate the entity based on the password.

30. A machine-readable medium as recited in claim 29, wherein the entity is a user.

31. A machine-readable medium as recited in claim 29, wherein the entity is a computer.

32. A machine-readable medium as recited in claim 29, wherein the entity is a software application.

33. A machine-readable medium as recited in claim 29, further comprising:
generating the authentication code with the authentication computer based on the request for authentication.

34. A machine-readable medium as recited in claim 29, further comprising:
receiving the authentication code at the mobile device of the user; and
the mobile device of the user deriving an authentication reply from the authentication code, wherein the password is derived from the authentication reply.

35. A machine-readable medium as recited in claim 29, the method further comprising:
generating at the authentication computer a model password based on the authentication code;
wherein authenticating the entity comprises comparing the password from the user computer with the model password.

36. A machine-readable medium as recited in claim 29, wherein the mobile device of the user is a wireless telephone.

37. A machine-readable medium as recited in claim 29, wherein the mobile device of the user is a personal digital assistant.

38. A machine-readable medium as recited in claim 29, wherein the mobile device of the user is a personal computer.

39. A machine-readable medium as recited in claim 29, wherein the mobile device of the user is Java-enabled.

40. A machine-readable medium as recited in claim 34, wherein the authentication reply is the password.

41. A machine-readable medium as recited in claim 34, wherein the password comprises the authentication reply.

42. A machine-readable medium as recited in claim 34, wherein the authentication code is received by the computer of the user directly from the authentication computer.

43. A machine-readable medium as recited in claim 34, wherein the authentication code is received by the computer of the user from the user.

44. A machine-readable medium having stored thereon a series of instructions which, when executed by a processor, cause the processor to facilitate the authentication of an entity by:
receiving at a mobile device of a user from the computer of a user an authentication code from an authenticating computer system, wherein the authentication code is provided to the computer of the user by the authenticating computer system in response to a request for authentication made to the authenticating computer system from the computer of the user, wherein the authentication code comprises a unique value provided to the computer of the user as a challenge to the request for the action that requires authentication;
deriving with the mobile device of the user from the authentication code an authentication reply, wherein the authentication reply comprises a value derived from the authentication code but different from the authentication code; and
providing the authentication reply from the mobile device of the user to an entity, wherein the authentication reply is used by the computer of the user to derive a password for authenticating the entity on the authenticating computer system, wherein the password comprises a one-time password for the requested action derived from the authentication reply.

45. A machine-readable medium as recited in claim 44, wherein deriving the authentication reply comprises:
receiving a personal information code from the entity;
decrypting a user token;
receiving an authentication code; and
deriving the authentication reply with the user token.

46. A machine-readable medium as recited in claim 44, wherein deriving the authentication reply with the user token comprises:
combining the user token and the authentication code; and
creating a hash value from the combined user token and authentication code.

47. A machine-readable medium as recited in claim 44, wherein deriving the authentication reply with the user token further comprises:
deriving a mask from the user token; and
applying the mask to the hash value to create a masked hash value.

48. A machine-readable medium as recited in claim 44, wherein providing the authentication reply comprises displaying the authentication reply on a display screen.

49. A computer system of a user comprising:
a processor; and
a memory containing instructions which, when executed by the processor, cause the computer system of the user to:
send an authentication request to an authentication computer, the authenticating request comprising a request for an action that requires authentication of an entity by the authentication computer;

receive an authentication code from the authenticating computer in response to the authentication request, wherein the authentication code comprises a unique value provided to the computer of the user as a challenge to the request for the action that requires authentication;

transmit the authentication code to a mobile device of the user;

receive an authentication reply derived by the mobile device of the user from the authentication code, wherein the authentication reply comprises a value derived from the authentication code but different from the authentication code;

derive a password based on the authentication reply, wherein the password comprises a one-time password for the requested action derived from the authentication reply; and transmit the password to the authenticating computer to authenticate the entity based on the password.

* * * * *

UNITED STATES PATENT AND TRADEMARK OFFICE
CERTIFICATE OF CORRECTION

| | | |
|---|---|---|
| PATENT NO. | : 8,601,264 B2 | Page 1 of 1 |
| APPLICATION NO. | : 11/718494 | |
| DATED | : December 3, 2013 | |
| INVENTOR(S) | : Maj et al. | |

It is certified that error appears in the above-identified patent and that said Letters Patent is hereby corrected as shown below:

In the Specification

In column 10, line 58, after "be" delete "a".

Signed and Sealed this
Third Day of June, 2014

Michelle K. Lee
*Deputy Director of the United States Patent and Trademark Office*